(12) United States Patent
Kolchin et al.

(10) Patent No.: US 10,887,580 B2
(45) Date of Patent: Jan. 5, 2021

(54) THREE-DIMENSIONAL IMAGING FOR SEMICONDUCTOR WAFER INSPECTION

(71) Applicant: KLA-Tencor Corporation, Milpitas, CA (US)

(72) Inventors: Pavel Kolchin, Fremont, CA (US); Robert M. Danen, Pleasanton, CA (US); Philip Measor, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 212 days.

(21) Appl. No.: 15/683,077

(22) Filed: Aug. 22, 2017

(65) Prior Publication Data

US 2018/0103247 A1     Apr. 12, 2018

Related U.S. Application Data

(60) Provisional application No. 62/405,435, filed on Oct. 7, 2016.

(51) Int. Cl.
  *H04N 13/254* (2018.01)
  *H04N 13/221* (2018.01)
  (Continued)

(52) U.S. Cl.
  CPC ....... *H04N 13/254* (2018.05); *G01N 21/9505* (2013.01); *G01N 21/956* (2013.01);
  (Continued)

(58) Field of Classification Search
  None
  See application file for complete search history.

(56) References Cited

U.S. PATENT DOCUMENTS 5,608,526 A   3/1997   Piwonka-Corle et al.
5,859,424 A   1/1999   Norton et al.
              (Continued)

FOREIGN PATENT DOCUMENTS

JP              4600476 B2      12/2010
KR       10-2009-026905 A        3/2009
KR              4600476 B1       5/2015

OTHER PUBLICATIONS

Arceo, A., "Use of TSOM for sub-11 nm node pattern defect detection and HAR features", Proceedings of SPIE vol. 8681 86812G-1 (2013) (Year: 2013).*

(Continued)

*Primary Examiner* — Lindsay J Uhl
(74) *Attorney, Agent, or Firm* — Spano Law Group; Joseph S. Spano

(57) ABSTRACT

Methods and systems for improved detection and classification of defects of interest (DOI) on semiconductor wafers based on three-dimensional images are described herein. Three dimensional imaging of volumes of thick, layered structures enables accurate defect detection and estimation of defect location in three dimensions at high throughput. A series of images are acquired at a number of different wafer depths. A three dimensional image of a thick semiconductor structure is generated from the series of images. Defects are identified and classified based on an analysis of the three dimensional image of the thick semiconductor structure. In some examples, the three-dimensional image stack is visualized by contour plots or cross-sectional plots to identify a characteristic defect response. In some examples, the three-dimensional image is processed algorithmically to identify and classify defects. In another aspect, the location of a defect is estimated in three dimensions based on the three dimensional image.

27 Claims, 8 Drawing Sheets

(51) Int. Cl.
| | |
|---|---|
| *G06K 9/20* | (2006.01) |
| *G06T 5/50* | (2006.01) |
| *G06T 7/00* | (2017.01) |
| *G01N 21/956* | (2006.01) |
| *H04N 13/271* | (2018.01) |
| *G01N 21/95* | (2006.01) |
| *G01N 21/88* | (2006.01) |
| *G06T 7/70* | (2017.01) |
| *G01N 21/84* | (2006.01) |
| *G06K 9/40* | (2006.01) |
| *G06K 9/62* | (2006.01) |

(52) U.S. Cl.
CPC .............. *G06K 9/2027* (2013.01); *G06T 5/50* (2013.01); *G06T 7/0004* (2013.01); *H04N 13/221* (2018.05); *H04N 13/271* (2018.05); *G01N 2021/8438* (2013.01); *G01N 2021/8861* (2013.01); *G06K 9/40* (2013.01); *G06K 9/6267* (2013.01); *G06T 7/0008* (2013.01); *G06T 7/70* (2017.01); *G06T 2207/10028* (2013.01); *G06T 2207/10148* (2013.01); *G06T 2207/20221* (2013.01); *G06T 2207/30148* (2013.01)

(56) References Cited

U.S. PATENT DOCUMENTS

| | | | |
|---|---|---|---|
| 6,201,601 | B1 | 3/2001 | Vaez-Iravani et al. |
| 6,208,411 | B1 | 3/2001 | Vaez-Iravani |
| 6,271,916 | B1 | 8/2001 | Marxer et al. |
| 6,429,943 | B1 | 8/2002 | Opsal et al. |
| 7,130,039 | B2 | 10/2006 | Vaez-Iravani et al. |
| 7,295,303 | B1 | 11/2007 | Vaez-Iravani et al. |
| 7,478,019 | B2 | 1/2009 | Zangooie et al. |
| 7,777,876 | B2 | 8/2010 | Horai et al. |
| 7,933,026 | B2 | 4/2011 | Opsal et al. |
| 8,614,415 | B2 | 12/2013 | Moribe et al. |
| 8,912,495 | B2 | 12/2014 | Lange |
| 9,007,581 | B2 | 4/2015 | Horai et al. |
| 9,075,027 | B2 | 7/2015 | Lange |
| 2002/0005947 | A1 | 1/2002 | Goldberg et al. |
| 2010/0084555 | A1* | 4/2010 | Luo .......................... G01N 1/28 250/311 |
| 2014/0111791 | A1 | 4/2014 | Manassen et al. |
| 2014/0139830 | A1* | 5/2014 | Lange ................ G01N 21/8806 356/237.5 |
| 2014/0172394 | A1 | 6/2014 | Kuznetsov et al. |
| 2014/0222380 | A1 | 8/2014 | Kuznetsov et al. |
| 2014/0268117 | A1 | 9/2014 | Kolchin et al. |
| 2014/0300890 | A1 | 10/2014 | Lange et al. |
| 2015/0028188 | A1* | 1/2015 | Kowalevicz ............. G02B 5/26 250/208.1 |
| 2015/0260659 | A1* | 9/2015 | Chuang ............ H01L 27/14609 250/370.08 |
| 2016/0209334 | A1 | 7/2016 | Chen et al. |
| 2017/0003230 | A1* | 1/2017 | Park .................... G01N 21/9501 |
| 2017/0116727 | A1* | 4/2017 | Kim .................... G01N 21/9501 |

OTHER PUBLICATIONS

Attota, R., "Resolving three-dimensional shape of sub-50 nm wide lines with nanometer-scale sensitivity using conventional optical microscopes", Appl. Phys. Lett. 05, 043101 (2014) (Year: 2014).*

Arceo, Abraham et al., "Use of TSOM for sub-11 nm node pattern defect detection and HAR features," Proc. of SPIE, vol. 8681, Metrology, Inspection, and Process Control for Microlithography XXVII, 86812G (2013).

Attota, Ravikiran et al., "Optimizing noise for defect analysis with through-focus scanning optical microscopy," Proc. of SPIE, vol. 9778, Metrology, Inspection, and Process Control for Microlithography XXX, 977811, Mar. 8, 2016.

Attota, Ravikiran et al., "Through-Focus Scanning Optical Microscopy," Proc. of SPIE, vol. 8036, Scanning Microscopies 2011: Advanced Microscopy Technologies for Defense, Homeland Security, Forensic, Life, Environmental, and Industrial Sciences, 803610, Jun. 1, 2011.

International Search Report dated Jan. 18, 2018, for PCT Application No. PCT/US2017/055436 filed on Oct. 5, 2017 by KLA-Tencor Corporation, 3 pages.

* cited by examiner

THREE-DIMENSIONAL IMAGING FOR SEMICONDUCTOR WAFER INSPECTION

CROSS REFERENCE TO RELATED APPLICATION

The present application for patent claims priority under 35 U.S.C. § 119 from U.S. provisional patent application Ser. No. 62/405,435, filed Oct. 7, 2016, the subject matter of which is incorporated herein by reference in its entirety.

TECHNICAL FIELD

The described embodiments relate to systems for specimen inspection, and more particularly to semiconductor wafer inspection modalities.

BACKGROUND INFORMATION

Semiconductor devices such as logic and memory devices are typically fabricated by a sequence of processing steps applied to a substrate or wafer. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Inspection processes are used at various steps during a semiconductor manufacturing process to detect defects on wafers to promote higher yield. As design rules and process windows continue to shrink in size, inspection systems are required to capture a wider range of physical defects while maintaining high throughput.

Inspection systems such as unpatterned wafer inspection systems and patterned wafer inspection systems illuminate and inspect a wafer for undesired defects. As semiconductor design rules continue to evolve, the minimum defect size that must be detected continues to shrink in size.

In addition, memory architectures are transitioning from two dimensional floating-gate architectures to fully three dimensional geometries. In some examples, film stacks and etched structures are very deep (e.g., up to six micrometers in depth, or more). Such high aspect ratio structures create challenges for patterned wafer inspection. The ability to measure defects buried within these structures is critical to achieve desired performance levels and device yield.

Traditional optical inspection techniques are based on planar, two-dimensional optical inspection. These techniques are fast enough to catch defects-of-interest (DOI) for thin layers (e.g., less than one micrometer thick), but are less effective for the detection of defects buried in relatively thick layers. Additionally, DOI detected by optical inspection are usually verified by SEM review. SEM review is often unfeasible for buried defects.

In one example, confocal optical inspection is employed at different layer depths. Confocal imaging eliminates spurious or nuisance optical signals from structures above and below the focal plane. However, important signal information resulting from the interaction of structures within the focal plane and structures above and below the focal plane is also lost. This loss of signal information may inhibit the ability to measure defect depth accurately and eliminate unwanted optical signals with a strong signal-to-noise ratio (SNR). The confocal optical inspection technique is described in further detail in U.S. Patent Publication No. 2014/0300890, which is incorporated herein by reference in its entirety.

In another example, a rotating illumination beam is employed to improve the detection of buried defects. However, the ability to measure weak defects is limited by splitting the optical intensity, thereby limiting sensitivity. Additionally, the resulting images are complicated, and it is difficult to interpret the effect of the wafer structure on the incident and collected optical fields. Optical inspection utilizing a rotating illumination beam is described in further detail in U.S. Patent Publication No. 2014/0268117, which is incorporated herein by reference in its entirety.

In some examples, electronic tests are employed to detect buried defects. However, all device layers must be fabricated before electronic tests are performed. Thus, defects cannot be detected early in the production cycle, resulting in lost time and expense. As a result, electronic tests are prohibitively expensive to perform on all lots during all steps in the production process, including research and development, production ramp, and high volume manufacture. Unfortunately, for some layers in the 3D NAND process, electronic tests have been the only solution.

In some other examples, wafers are de-processed to uncover buried defects. Wafer de-processing destroys the wafer by removing layers to reveal defects-of-interest (DOI) that can be detected using traditional optical inspection and verified with traditional SEM review. This approach requires alternate process flows at each layer, and the alternate processes may produce defects that interfere with DOI detection. In addition, some DOI on some layers are not easily revealed by wafer de-processing.

In some other examples, electron beam inspection (EBI) is employed to detect buried defects. EBI is limited in throughput and wafer coverage and may only be performed on some layers in the 3D NAND process. For most 3D NAND layers electrons cannot penetrate the overlying layers to reach the DOI. Thus, EBI is limited in its effectiveness as a defect detection tool for three dimensional structures.

Various inspection systems are used within the semiconductor industry to detect defects on a semiconductor reticle or wafer. Improvements to wafer and reticle inspection systems with application to vertical semiconductor devices, such as 3D memory, VNAND memory, or other vertical structures, are desired.

SUMMARY

Methods and systems for improved detection and classification of defects of interest (DOI) on semiconductor wafers based on three-dimensional images are described herein. Three dimensional imaging of volumes of thick, layered structures enables accurate defect detection and estimation of defect location in three dimensions at high throughput. Traditionally, signals arising from acceptable wafer variation (e.g., nuisance and noise) often limit detection of DOIs. However, three-dimensional imaging captures signal propagation within the wafer, and thus is able to differentiate DOIs from nuisance and noise, even for relatively thick samples (e.g., 3D NAND wafers with a layered structure thicker than three micrometers). In some examples, optical inspection of thick samples based on three dimensional imaging differentiates defects of interest residing on one layer from nuisance and noise originating from other layers.

In one aspect, a three dimensional image of a thick semiconductor structure is generated from a volume measured in two lateral dimensions (e.g., parallel to the wafer surface) and a depth dimension (e.g., normal to the wafer surface. In an inspection example, a series of images are acquired for a number of different wafer locations within the focal plane of the inspection system. In some examples, images corresponding to the same lateral positions at different focus offsets are aligned after data collection using alignment targets. For purposes of this patent document, focus offset is the relative distance between a surface of the specimen and the focal plane of the inspection system.

In another aspect, defects are identified and classified based on an analysis of a three dimensional image of a thick semiconductor structure. In some examples, the detected defects are separated into a group of defects of interest and a group of nuisance or noise defects.

In some embodiments, a three-dimensional image stack is plotted using 3D visualization techniques. The resulting renderings are read by an operator who selects defects of interest. In some examples, through focus cross-sections are plotted to visualize a characteristic defect response as a function of focus offset.

In some embodiments, a three-dimensional image is processed algorithmically to identify and classify defects of interest.

In another aspect, the three dimensional location of a defect of interest is determined based on an analysis of the three dimensional image of a thick semiconductor structure. In many dark field measurement applications, the diffraction orders are suppressed and the actual defect location in the z-direction is linearly related to the focus offset associated with the peak signal. In many bright field measurement applications, the actual defect location in the z-direction is also linearly related to the focus offset associated with the peak signal. In other examples, the actual defect position is determined by comparing the three dimensional image and one or more simulated three-dimensional images of a defect. In some other examples, a measurement library is generated that matches measured data with defect depths (e.g., distance below the wafer surface) measured by a trusted reference measurement system. Once the library is generated, defect locations associated with subsequent measurements are estimated based on library matching.

In a further aspect, the three dimensional image is filtered before defect analysis to improve SNR. In some examples, computing system analyzes the assembled three-dimensional image with a 3D digital filter, or other suitable numerical technique to detect unique three-dimensional structures arising from defects. This effectively increases the SNR of the defects and enables more effective separation of defects of interest from noise or nuisance effects.

In another further aspect, illumination apertures, collection apertures, or both, are tuned to minimize the response of the nominal structure and enhance the response of the defect signal.

In a further aspect, three dimensional measurement data is collected at multiple, different aperture settings, and defects are identified and classified based on a combined analysis of three dimensional images associated with each data set.

In another further aspect, defects are classified based on defect depth or other parameters determined based on three-dimensional images of a wafer structure.

The foregoing is a summary and thus contains, by necessity, simplifications, generalizations and omissions of detail; consequently, those skilled in the art will appreciate that the summary is illustrative only and is not limiting in any way.

Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for improved detection and classification of defects of interest (DOI) on semiconductor wafers based on three-dimensional images are described herein. Three dimensional imaging of volumes of thick, layered structures enables accurate defect detection and estimation of defect location in three dimensions at high throughput. Traditionally, signals arising from acceptable wafer variation (e.g., nuisance and noise) often limit detection of DOIs. However, three-dimensional imaging captures signal propagation within the wafer, and thus is able to differentiate DOIs from nuisance and noise, even for relatively thick samples (e.g., 3D NAND wafers with a layered structure thicker than three micrometers). In some examples, optical inspection of thick samples based on three dimensional imaging differentiates defects of interest residing on one layer from nuisance and noise originating from other layers.

Figure 1:
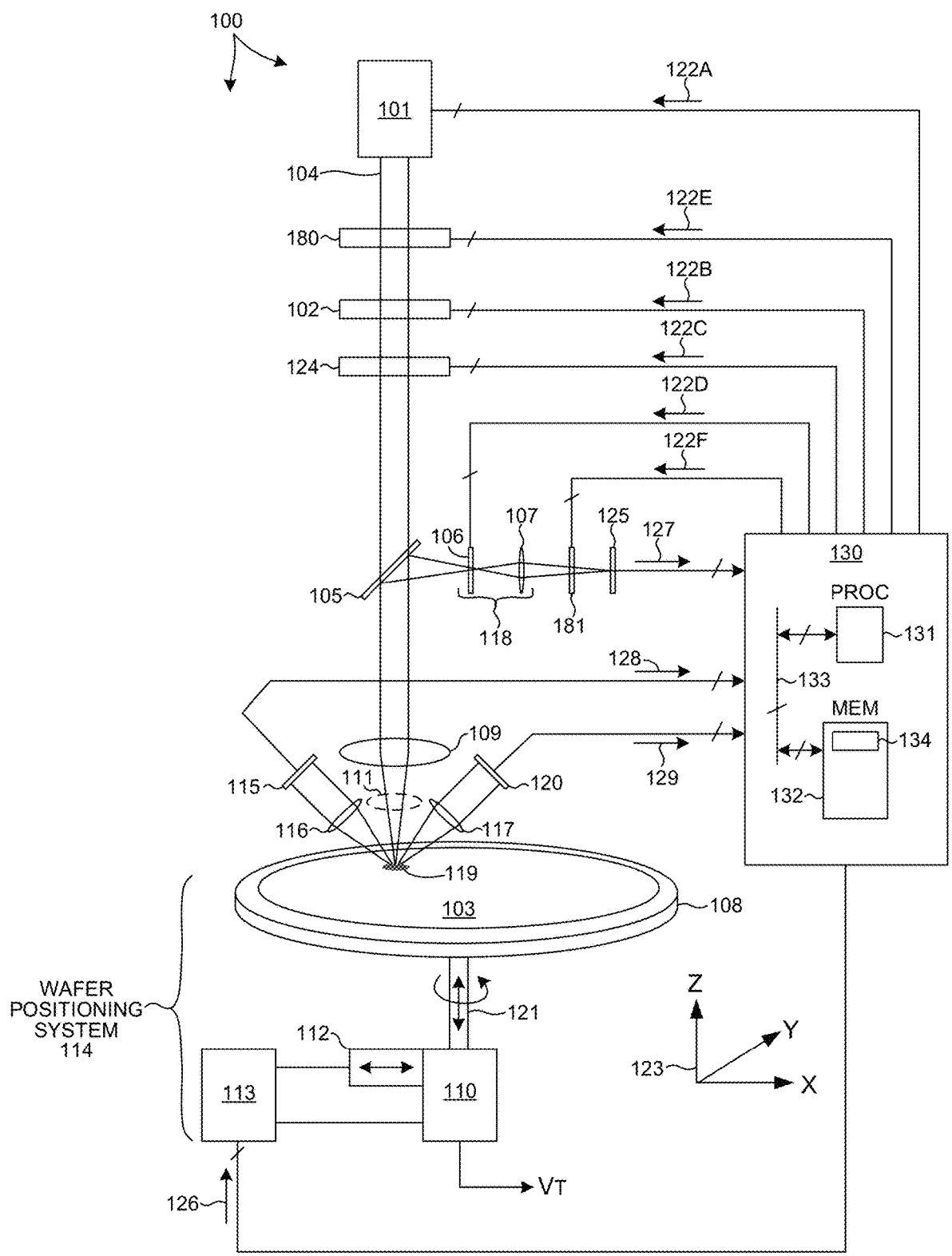
FIG. 1 is a simplified schematic view of one embodiment of an optical inspection system 100 configured to perform detection and classification of defects of interest (DOI) on semiconductor wafers based on three-dimensional images.

FIG. 1 is a simplified schematic view of one embodiment of an optical inspection system 100 configured to perform detection and classification of defects of interest (DOI) on semiconductor wafers based on three-dimensional images. Optical inspection system 100 includes an illumination subsystem, a collection subsystem, one or more detectors, and a computing system. The illumination subsystem includes an illumination source 101 and all optical elements in the illumination optical path from the illumination source to the wafer. The collection subsystem includes all optical elements in the collection optical path from the specimen to each detector. For simplification, some optical components of the system have been omitted. By way of example, folding mirrors, polarizers, beam forming optics, additional light sources, additional collectors, and detectors may also be included. All such variations are within the scope of the invention described herein. The inspection system described herein may be used for inspecting patterned and unpatterned wafers and reticles.

As illustrated in FIG. 1, a wafer 103 is illuminated by a normal incidence beam 104 generated by one or more illumination sources 101. Alternatively, the illumination subsystem may be configured to direct the beam of light to the specimen at an oblique angle of incidence. In some embodiments, system 100 may be configured to direct multiple beams of light to the specimen such as an oblique incidence beam of light and a normal incidence beam of light. The multiple beams of light may be directed to the specimen substantially simultaneously or sequentially.

Illumination source 101 may include, by way of example, a broad band laser sustained plasma light source, a laser, a supercontinuum laser, a diode laser, a helium neon laser, an argon laser, a solid state laser, a diode pumped solid state (DPSS) laser, a xenon arc lamp, a gas discharging lamp, an LED array, and an incandescent lamp. The light source may be configured to emit near monochromatic light or broadband light. In some embodiments, the illumination subsystem may also include one or more spectral filters that may limit the wavelength of the light directed to the specimen. The one or more spectral filters may be bandpass filters and/or edge filters and/or notch filters. Illumination may be provided to the specimen over any suitable range of wavelengths. In some examples, the illumination light includes wavelengths ranging from 260 nanometers to 950 nanometers. In some examples, illumination light includes wavelengths greater than 950 nanometers (e.g., extending to 2,500 nanometers) to capture defects in high aspect ratio structures. In some embodiments, the illumination subsystem may also include one or more polarization optics that control the polarization of the light directed to the specimen.

Beam 104 generated by illumination source 101 is directed to a beam splitter 105. Beam splitter 105 directs the beam to objective lens 109. Objective lens 109 focuses the beam 111 onto wafer 103 at incident spot 119. Incident spot 119 is defined (i.e., shaped and sized) by the projection of light emitted from illumination source 101 onto the surface of wafer 103. The inspection system 100 includes illumination aperture 124. As depicted in FIG. 1, computing system 130 communicates command signal 122C to illumination aperture 124. In response, illumination aperture 124 adjusts the illumination direction and beam shape provided onto the surface of the wafer 103. In one embodiment the illumination aperture 124 is an assembly that provides varied aperture shapes controlled by command signal 122C communicated from computing system 130. In general, the beam 111 and spot 119 can be controlled by the computing system 130, which communicates control signals to illumination source 101, illumination apertures 124, or both. As depicted in FIG. 1, computing system 130 communicates command signal 122A to illumination source 101. In response, illumination source 101 adjusts the spectral range(s) of the illumination beam 111. In general, the beam 111 that is incident on wafer 103 may differ from the light emitted by illumination source 101 in one or more ways, including polarization, intensity, size and shape, etc.

In the embodiment depicted in FIG. 1, inspection system 100 includes selectable illumination polarization elements 180. In one example, computing system 130 communicates command signal 122E to illumination polarization elements 180. In response, illumination polarization elements 180 adjust the polarization of the illumination light provided onto the surface of the wafer 103.

System 100 includes collection optics 116, 117, and 118 to collect the light scattered and/or reflected by wafer 103 and focus that light onto detector arrays 115, 120, and 125, respectively. The outputs of detectors 115, 120, and 125 are communicated to computing system 130 for processing the signals and determining the presence of defects and their locations.

Any of collection optics 116-118 may be a lens, a compound lens, or any appropriate lens known in the art. Alternatively, any of collection optics 116-118 may be a reflective or partially reflective optical component, such as a mirror. In addition, although particular collection angles are illustrated in FIG. 1, it is to be understood that the collection optics may be arranged at any appropriate collection angle. The collection angle may vary depending upon, for example, the angle of incidence and/or topographical characteristics of the specimen.

Each of detectors 115, 120, and 125 generally function to convert the reflected and scattered light into an electrical signal, and therefore, may include substantially any photodetector known in the art. However, a particular detector may be selected for use within one or more embodiments of the invention based on desired performance characteristics of the detector, the type of specimen to be inspected, and the configuration of the illumination. For example, if the amount of light available for inspection is relatively low, an efficiency enhancing detector such as a time delay integration (TDI) camera may increase the signal-to-noise ratio and throughput of the system. However, other detectors such as charge-coupled device (CCD) cameras, photodiodes, phototubes and photomultiplier tubes (PMTS) may be used, depending on the amount of light available for inspection and the type of inspection being performed. In at least one embodiment of the invention, a photomultiplier tube is used for detecting light scattered from a specimen. Each detector may include only one sensing area, or possibly several sensing areas (e.g., a detector array or multi-anode PMT).

System 100 can use various imaging modes, such as bright field and dark field modes. For example, in one embodiment, detector 125 generates a bright field image. As illustrated in FIG. 1, some amount of light scattered from the surface of wafer 103 at a narrow angle is collected by objective lens 109. This light passes back through objective lens 109 and impinges on beam splitter 105. Beam splitter 105 transmits a portion of the light to collection optics 118, which in turn focuses the light onto detector 125. In this manner a bright field image is generated by detector array 125. Collection optics 118 includes imaging lens 107 that images the reflected light collected by objective lens 109 onto detector array 125. An aperture or Fourier filter 106 is placed at the back focal plane of objective lens 109. Various imaging modes such as bright field, dark field, and phase contrast can be implemented by using different illumination apertures 124, collection apertures, Fourier filters 106, or combinations thereof. The configuration of the imaging mode, such as illumination direction or imaging collection solid angle, can be determined based on DOI signal and three-dimensional images. U.S. Pat. Nos. 7,295,303 and 7,130,039, which are incorporated by reference herein, describe these imaging modes in further detail. In another example, detectors 115 and 120 generate dark field images by imaging scattered light collected at larger field angles. U.S. Pat. No. 6,208,411, which is incorporated by reference herein, describes these imaging modes in further detail.

In the embodiment depicted in FIG. 1, inspection system 100 includes selectable collection polarization elements 181. In one example, computing system 130 communicates command signal 122F to collection polarization elements 181. In response, collection polarization elements 181 adjust the polarization of the collected light provided onto the surface of detector 125.

System 100 also includes various electronic components (not shown) needed for processing the reflected and/or scattered signals detected by any of detectors 115, 120, and 125. For example, system 100 may include amplifier circuitry to receive output signals from any of detectors 115, 120, and 125 and to amplify those output signals by a predetermined amount and an analog-to-digital converter (ADC) to convert the amplified signals into a digital format suitable for use within processor 131. In one embodiment, the processor may be coupled directly to an ADC by a transmission medium. Alternatively, the processor may receive signals from other electronic components coupled to the ADC. In this manner, the processor may be indirectly coupled to the ADC by a transmission medium and any intervening electronic components.

In the embodiment illustrated in FIG. 1, wafer positioning system 114 moves wafer 103 under beam 111 based on commands 126 received from computing system 130. Wafer positioning system 114 includes a wafer chuck 108, motion controller 113, a rotation stage 110, translation stage 112, and z-translation stage 121. Z-translation stage 121 is configured to move wafer 103 in a direction normal to the surface of wafer 103 (e.g., the z-direction of coordinate system 123). Translation stage 112 and rotation stage 110 are configured to move wafer 103 in a direction parallel to the surface of wafer 103 (e.g., the x and y directions of coordinate system 123). In some other embodiments, wafer 103 is moved in the in-plane directions (e.g., x and y directions) by the coordinated motion of multiple translation stages.

Wafer 103 is supported on wafer chuck 108. In some embodiments, wafer 103 is located with its geometric center approximately aligned with the axis of rotation of rotation stage 110. In this manner, rotation stage 110 spins wafer 103 about its geometric center at a specified angular velocity, $\omega$, within an acceptable tolerance. In addition, translation stage 112 translates the wafer 103 in a direction approximately perpendicular to the axis of rotation of rotation stage 110 at a specified velocity, $V_T$. Motion controller 113 coordinates the spinning of wafer 103 by rotation stage 110 and the translation of wafer 103 by translation stage 112 to achieve a desired in-plane scanning motion of wafer 103 within inspection system 100. In addition, motion controller 113 coordinates the movement of wafer 103 by translation stage 121 to achieve a desired out-of-plane scanning motion of wafer 103 within inspection system 100.

Wafer 103 may be positioned relative to the optical subsystems of inspection system 100 in a number of different modes. In an inspection mode, wafer 103 is repeatedly scanned in the lateral directions (e.g., x-direction and y-direction) at each different z-position. In some examples, wafer 103 is scanned at two or more different z-positions, corresponding to two or more depths (e.g., distance below wafer surface) through a layered structure. In a defect review mode, wafer 103 is positioned in a fixed position in the x-direction and y-directions, while scanning in the z-direction. In this manner, three dimensional images are generated based on measurement data at a fixed lateral position of wafer 103 over a range of depths within the structure under measurement. Defect review mode is typically employed to perform more detailed investigation of defects (e.g., higher image resolution, higher focal depth resolution, or both).

In some embodiments, the wafer is moved to a number of different z-positions with respect to the focal plane of the inspection system to image different depths of the wafer stack. In some other embodiments, the position of the focal plane of the inspection system is adjusted optically to a number of different z-positions with respect to the wafer to image different depths of the wafer stack. The images collected at each z-position are aggregated to form a three dimensional volume image of a thick semiconductor structure measured in two lateral dimensions (e.g., parallel to the wafer surface) and a number of different depths (i.e., different z-positions).

In general, the optical subsystem, including both the illumination and collection subsystems, generates a focused optical image at each of a plurality of focus planes located at a plurality of different depths of a structure under measurement (e.g., a vertically stacked structure). The alignment of the focus plane of the optical subsystem at each different depth is achieved by optical adjustment that moves the focus plane in the z-direction, specimen positioning in the z-direction, or both. One or more detectors detect the light collected at each of the plurality of different depths and generate a plurality of output signals indicative of the amount of light collected at each of the plurality of different depths.

In some embodiments, system 100 may include a deflector (not shown). In one embodiment, the deflector may be an acousto-optical deflector (AOD). In other embodiments, the deflector may include a mechanical scanning assembly, an electronic scanner, a rotating mirror, a polygon based scanner, a resonant scanner, a piezoelectric scanner, a galvo mirror, or a galvanometer. The deflector scans the light beam over the specimen. In some embodiments, the deflector may scan the light beam over the specimen at an approximately constant scanning speed.

As depicted in FIG. 1, inspection system 100 includes an illumination power attenuator 102 that controls the illumination power delivered to wafer 103. In some other embodiments, the illumination power density attenuator is a beam shaping element that resizes the illumination spot 119 to reduce the illumination power density delivered to wafer 103. In some other embodiments, a combination of illumination power reduction and beam sizing is employed to reduce the illumination power density delivered to wafer 103. As depicted in FIG. 1, computing system 130 communicates a control signal to illumination power attenuator 102 to control illumination power based on the three dimensional images detected by any of detectors 115, 120, and 125. In general, illumination power attenuator 102 is optional. Thus, in some other embodiments, inspection system 100 does not include illumination power attenuator 102.

Figure 2:
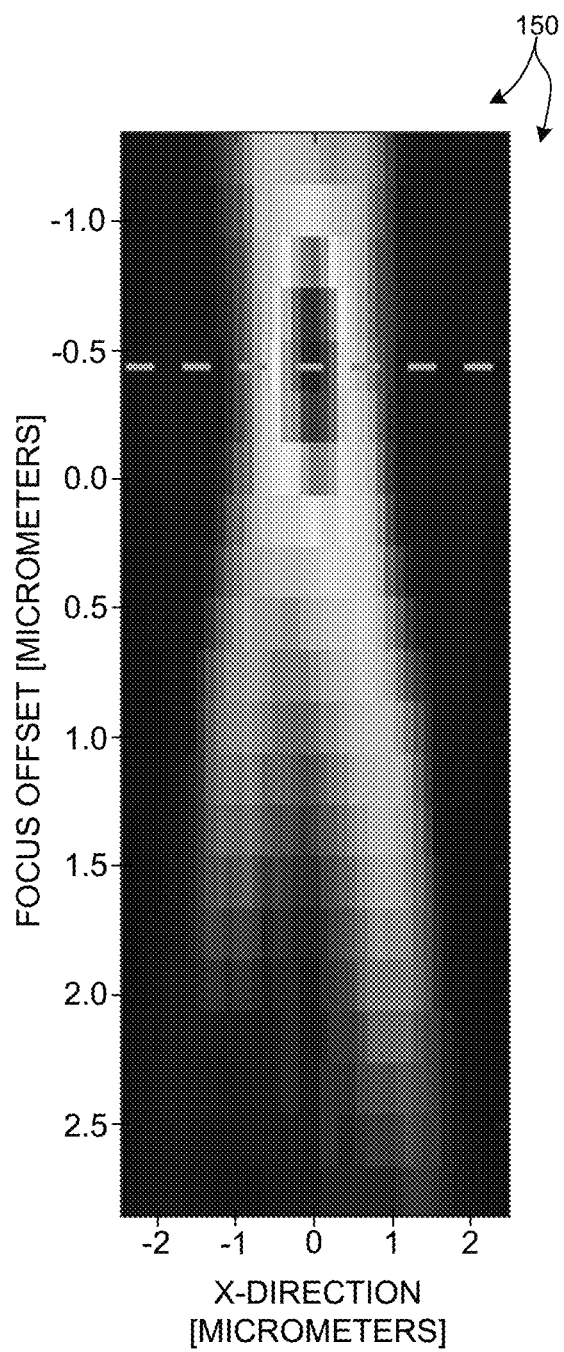
FIG. 2 depicts a plot 150 of a cross-sectional view of a measured three dimensional image illustrating a peak signal near a focus offset of −0.5 micrometers.
Figure 3:
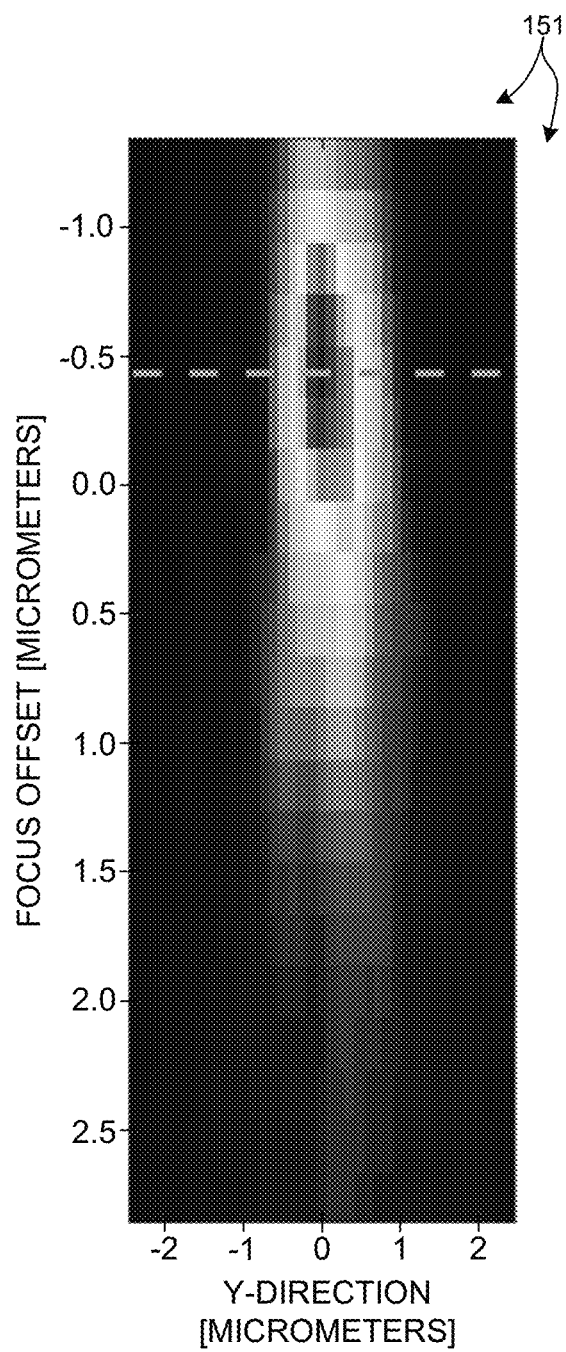
FIG. 3 depicts a plot 151 of another cross-sectional view of the measured three dimensional image also illustrating a peak signal near a focus offset of −0.5 micrometers.

In one aspect, a three dimensional image of a thick semiconductor structure is generated from a volume measured in two lateral dimensions (e.g., parallel to the wafer surface) and a depth dimension (e.g., normal to the wafer surface). In the embodiment depicted in FIG. 1, computing system 130 arranges the outputs from one or more of the measurement channels (e.g., from one or more of detectors 115, 120, and 125) into a volumetric data set that corresponds to the measured volume. FIG. 2 depicts a plot 150 of a cross-sectional view (y=0) of a measured three dimensional image illustrating a peak signal near a focus offset of −0.5 micrometers. FIG. 3 depicts a plot 151 of another cross-sectional view (x=0) of the measured three dimensional image also illustrating a peak signal near a focus offset of −0.5 micrometers.

In a defect review example, a series of images are acquired at the same (x,y) location for a number of different wafer locations within the focal plane of the inspection system. In this example, computing system 130 generates a three-dimensional image of the measured volume by assembling a stack of the series of two-dimensional images acquired at each different focus offset. In some examples, a series of images for a predefined set of focus offsets is collected while keeping illumination intensity and other system parameters unchanged. Focus offset is the relative distance between the most reflective surface of the specimen and the focal plane of the inspection system. In general, the parameter to be scanned is not limited to the focus offset. In other examples, sensor axial position, spectral band, illumination direction, etc. can be scanned to form a three-dimensional defect image. In some embodiments, a defect image having more than three dimensions is generated by computing system 130. In one example, both focus offset and illumination direction are scanned for a given (x,y) location. In one example, computing system 130 generates a four dimensional image of the measured volume by assembling the series of two-dimensional images acquired at each different focus offset and each different illumination angle into a fourth order tensor.

In an inspection example, a series of images are acquired at various (x,y) locations for a number of different wafer locations within the focal plane of the inspection system. Image misalignment between different focus offsets must be minimized. In some examples, this is achieved by collecting data with the wafer stage accurately positioned for different depth measurements. However, this approach may significantly reduce throughput. In some other examples, images corresponding to the same lateral positions at different focus offsets are aligned after data collection using alignment targets.

In another aspect, defects are identified and classified based on an analysis of a three dimensional image of a thick semiconductor structure. In some examples, the detected defects are separated into a group of defects of interest and a group of nuisance or noise defects.

Figure 4:
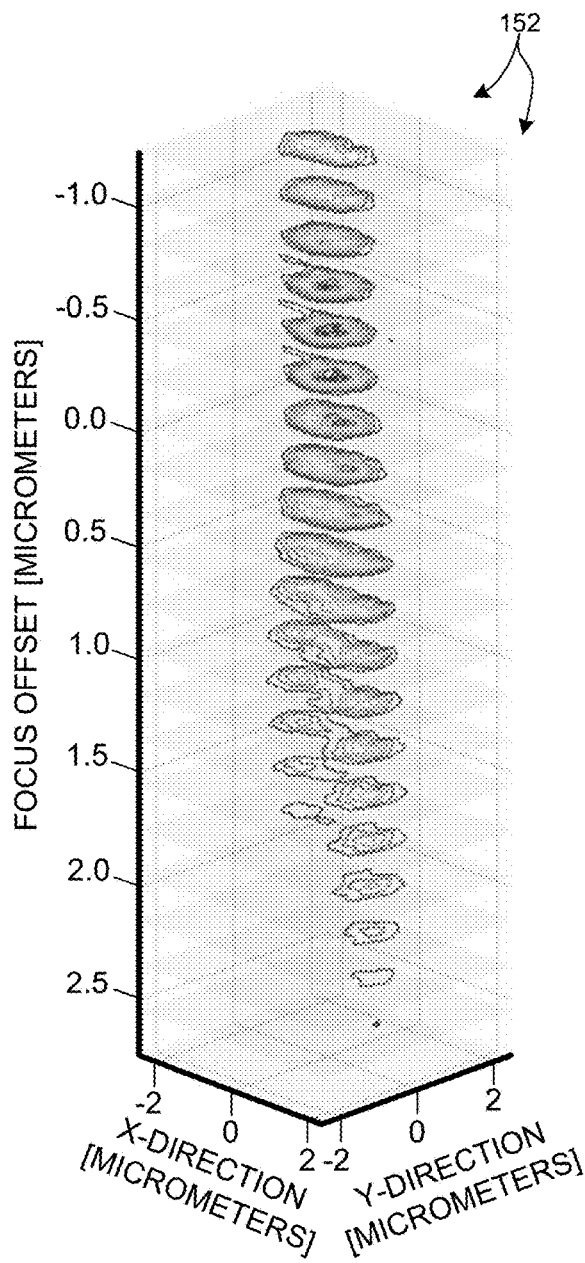
FIG. 4 depicts a three dimensional contour map 152 of a measured signal through an inspected volume of a three dimensional structure.

In some embodiments, a three-dimensional image stack is plotted using 3D visualization techniques. The resulting renderings are read by an operator who selects defects of interest. In one embodiment, inspection system 100 includes peripheral devices useful to accept inputs from an operator (e.g., keyboard, mouse, touchscreen, etc.) and display outputs to the operator (e.g., display monitor). Input commands from an operator may be used by processor 131 to flag defects. Three dimensional images of an inspected volume may be graphically presented to an operator on a display monitor. For example, FIG. 4 depicts a three dimensional contour map 152 of a measured signal through an inspected volume that can be presented to an operator for analysis.

In some examples, through focus cross-sections are plotted by computing system 130 to visualize a characteristic defect response as a function of focus offset. For example, FIGS. 2 and 3 depict x and y cross-sections, respectively, of a three-dimensional image of measured signal.

In general, any parameter measured in three dimensions may be plotted by computing system 130 for visualization purposes. For example, measured signal, noise, and signal to noise ratio (SNR) may all be plotted as function of the focus offset.

In some embodiments, a three-dimensional image is processed algorithmically to identify and classify defects of interest. In some examples, processor 131 is configured to detect and classify defects from a three-dimensional image. The processor may include any appropriate processor known in the art. In addition, the processor may be configured to use any appropriate defect detection and classification algorithm or method known in the art. For example, the processor may use a die-to-database comparison, a three-dimensional filter, a clustering algorithm such as a principal component analysis or spectral clustering, a thresholding algorithm, a deep learning algorithm, or any other suitable algorithm to detect and classify defects on the specimen.

In another aspect, the three dimensional location of a defect of interest is determined based on an analysis of the three dimensional image of a thick semiconductor structure. In this manner, the actual position of a defect within a wafer is measured (e.g., $\{x,y,z\}$ coordinates of the defect). The actual defect position can be used to locate the defect later for further analysis (e.g., analysis by a focused ion beam system, EBI system, etc.).

In some examples, the x-position, y-position, and focus offset associated with the peak defect signal within the 3D image is used to evaluate the actual defect position within the wafer structure (e.g., 3D NAND wafer stack).

Figure 5:
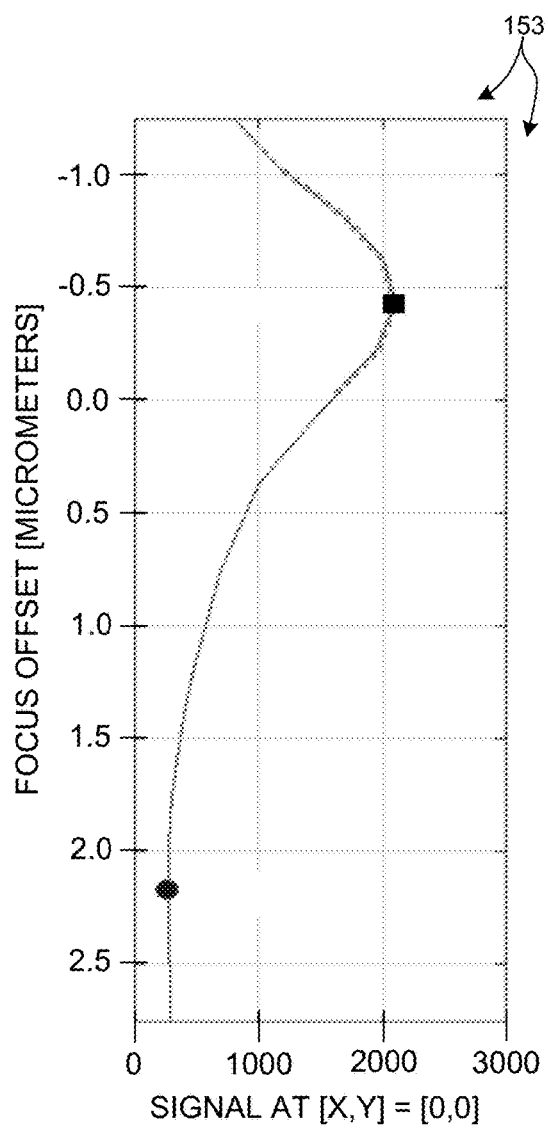
FIG. 5 depicts a plot 153 of a measured signal at a fixed lateral position for a range of focus offset values.

In many dark field measurement applications, the diffraction orders are suppressed and the actual defect location in the z-direction (e.g., depth) is linearly related to the focus offset associated with the peak signal. For many cases of incoherent BF illumination the defect location in the z-direction is linearly related to the focus offset associated with the peak signal. In these examples, computing system 130 determines the focus offset associated with the peak and determines the defect depth by multiplying the focus offset by a scaling factor. For example, FIG. 5 depicts a plot 153 of the measured signal at the zero lateral position (i.e., $\{x,y\}=\{0,0\}$) for a range of focus offset values. As depicted in FIG. 5, the signal reaches a maximum value at a focus offset value of −0.44 micrometers. Computing system 130 identifies this maximum value and determines the actual defect depth by multiplying the focus offset by a scaling factor.

In other examples, the actual defect position is determined by comparing the three dimensional image and one or more simulated three-dimensional images of a defect. In one example, computing system 130 performs a rigorous coupled wave analysis (RCWA) to simulate the measured defect response. This analysis may be performed recursively to minimize the error between the measured response and the simulated response and identify and locate the defect.

In some other examples, a measurement library is generated that matches measured data with defect depths (e.g., distance below the wafer surface) measured by a trusted reference measurement system. In one example, the trusted reference measurement system is a defect review performed after focus ion beam etching of a specimen under consideration. Once the library is generated, defect locations associated with subsequent measurements are estimated based on library matching.

In a further aspect, the three dimensional image is filtered before defect analysis to improve SNR. In some examples, computing system analyzes the assembled three-dimensional image with a 3D digital filter, or other suitable numerical technique to detect unique three-dimensional structures arising from defects. This effectively increases the SNR of the defects and enables more effective separation of defects of interest from noise or nuisance effects.

In another further aspect, illumination apertures, collection apertures, spectral band, Fourier filters, polarization optics, or any combination thereof, are tuned to achieve one or more performance objectives. Exemplary performance objectives include, but are not limited to minimizing the response of the nominal structure in the three dimensional image, enhancing the response of the defect signal in the three dimensional image, minimizing the response of wafer noise or nuisance signals in the three dimensional image, discriminating the response of the defect from wafer noise or the nuisance signals in three dimensional images, improving the accuracy of estimated physical location of the defect from the three dimensional image, any combination thereof.

In some examples, the nominal structure is periodic, so the diffraction orders are visible in the Fourier domain. In these examples, an aperture is selected to suppress the diffraction orders. This is particularly important when identifying defects based on response peaks within the 3-D image data set. In examples where model based defect detection (e.g., bright field measurements) is performed, suppression of the nominal structural response is less critical because the model captures this response.

In some embodiments, inspection system 100 includes selectable illumination aperture elements, selectable collection aperture elements (not shown), selectable Fourier filter elements 106, selectable illumination polarization elements 180, selectable collection polarization elements 181, and an illumination source 101 having a selectable spectral band. Computing system 130 communicates command signals 122A to illumination source 101 to adjust the spectral output of the illumination light, command signals 122B to attenuator 102 to adjust the beam power, command signals 122C to adjust the size and shape of illumination apertures 124, command signals 122D to adjust the Fourier filter components 106 in the collection beam path, command signals 122E to illumination polarization optics 180 to adjust polarization of the illumination light, command signals 122F to collection polarization optics 181 in the collection beam path, and command signals (not shown) to collection apertures to adjust the size and shape of the collection apertures. Computing system 130 generates and communicates command signals 122A-F such that one or more of the aforementioned performance objectives is achieved.

In some examples, illumination apertures, collection apertures, or both, are tuned to enhance the response of the defect signal and minimize the response to wafer noise or nuisance. In other examples, apertures are tuned to generate desired three-dimensional images for defects, nuisance or noise.

In a further aspect, three dimensional measurement data is collected at multiple, different aperture settings, and defects are identified and classified based on a combined analysis of three dimensional images associated with each data set.

In another further aspect, defects are classified based on defect depth or other parameters determined based on three-dimensional images of a wafer structure.

Figure 6:
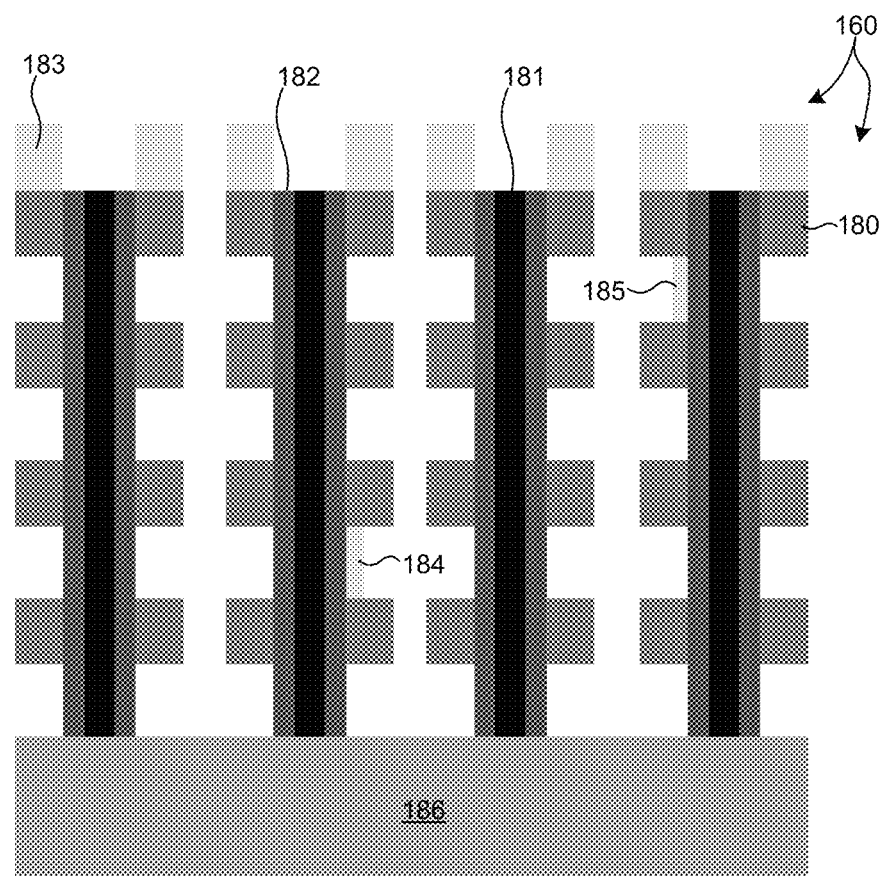
FIG. 6 depicts an illustration of a 3D NAND structure 160 at the silicon nitride removal step of the wafer production process.
Figure 7A:
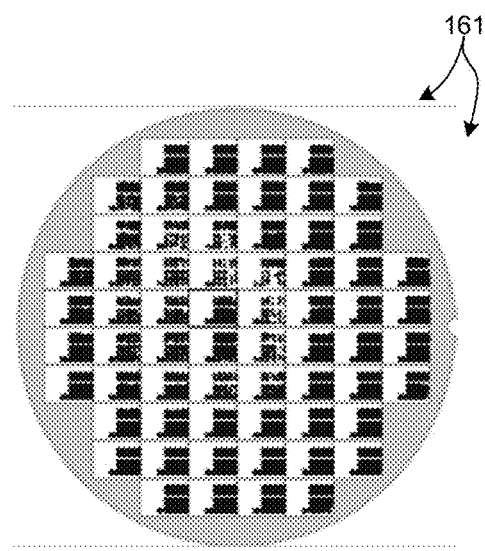
FIG. 7A depicts an illustration of a defect map resulting from a two dimensional optical inspection performed at zero focus offset.
Figure 8A:
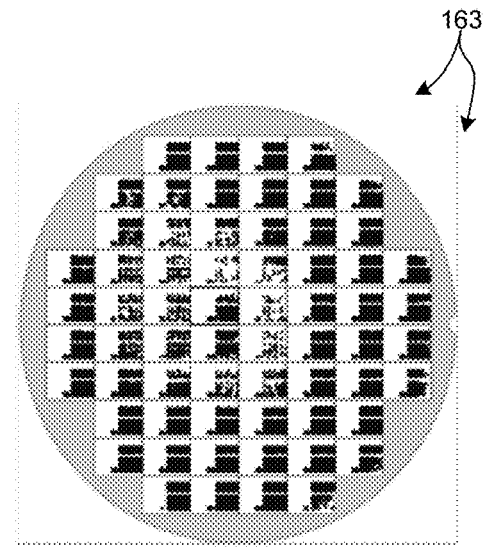
FIG. 8A depicts an illustration of a defect map resulting from a two dimensional optical inspection performed at a focus offset of one micrometer.
Figure 7B:
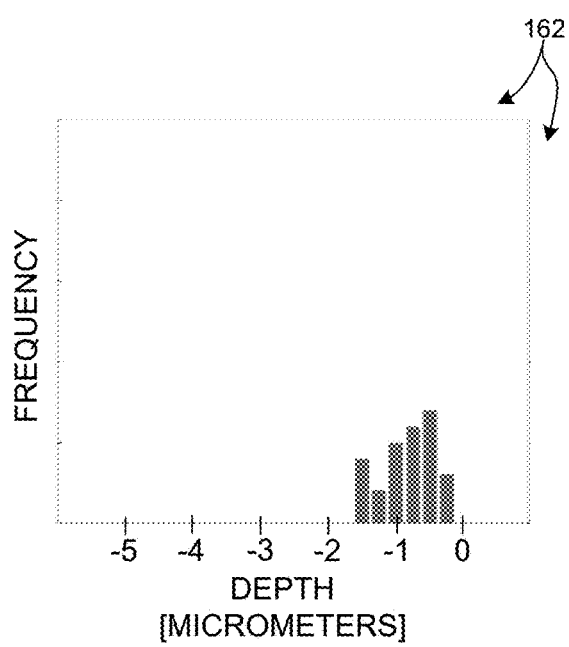
FIG. 7B depicts an illustration of the number of defects detected at different depths from the two dimensional optical inspection illustrated in FIG. 7A.
Figure 8B:
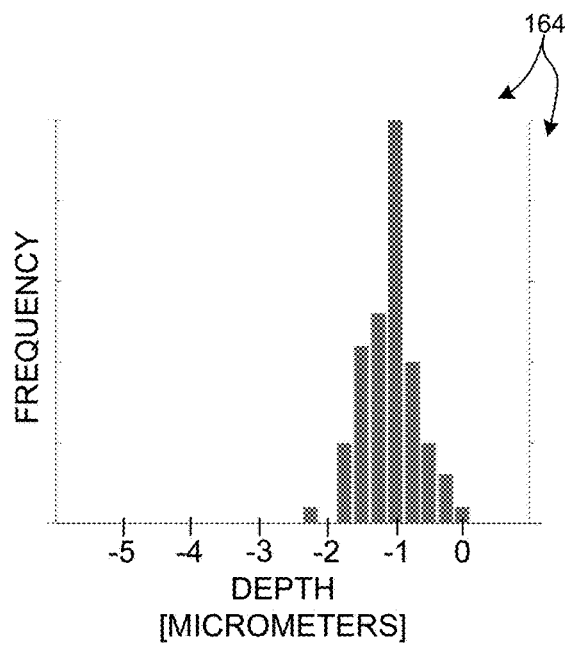
FIG. 8B depicts an illustration of the number of defects detected at different depths from the two dimensional optical inspection illustrated in FIG. 8A.
Figure 10A:
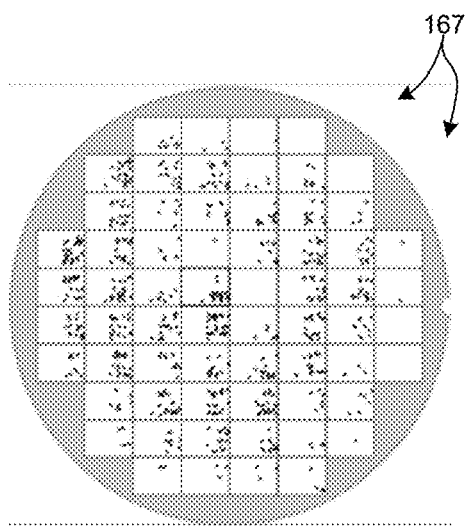
FIG. 10A depicts an illustration of a defect map resulting from a two dimensional optical inspection performed at a focus offset of three micrometers.

FIG. 6 depicts a simplified illustration of a 3D NAND structure 160 at the silicon nitride (e.g., SiN or Si3N4) removal step of the wafer production process. FIG. 6 is depicted for illustration purposes. A manufactured 3D NAND structure includes additional features and elements. In one example, a manufactured 3D NAND structure includes many additional layers and some of the depicted structures (e.g., structure 182) include additional materials. Polysilicon structures 182 surrounding oxide core structures 181 extend vertically (e.g., normal to the surface of substrate 186) in the multi-layer 3D NAND structure. Layers of Silicon oxide 180 are spaced apart from one another by layers of Silicon nitride (not shown) that are subsequently etched away. Silicon nitride layer 183 is not etched away for purposes of illustration in FIG. 6. The next step in the process is to grow tungsten in the space between the silicon oxide layers. However, as illustrated in FIG. 6, incomplete etching has left behind silicon nitride defects 184 and 185. The electronic device will not function with defects 184 and 185. Thus, it is important to measure this defect as early as possible in the fabrication process to prevent loss of time and resources associated with further processing of a device that is destined to fail.

As depicted in FIG. 6, many DOI occur at different depths of the 3D NAND structure. Furthermore, it is challenging to separate defects that occur near the surface of the wafer from defects that occur near the bottom of the structure. FIGS. 7A, 8A, 9A, and 10A depict plots 161, 163, 165, and 167, respectively. Plots 161, 163, 165, and 167 illustrate four optical inspections performed at different focus offsets. Plot 161 depicts a two dimensional optical inspection performed at zero focus offset. Plot 163 depicts a two dimensional optical inspection performed at a focus offset of one micrometer. Plot 165 depicts a two dimensional optical inspection performed at a focus offset of two micrometers. Plot 167 depicts a two dimensional optical inspection performed at a focus offset of three micrometers. Each dot depicted in plots 161, 163, 165, and 167 represents a potential defect.

FIGS. 7B, 8B, 9B, and 10B depict plots 162, 164, 166, and 168, respectively. Plots 162, 164, 166, and 168 illustrate the number of defects detected with different depths below the wafer surface for each of the two dimensional measurements depicted in FIGS. 7A, 8A, 9A, and 10A, respectively. As the focal plane is moved deeper into the wafer, the number of defects decreases.

In addition, when the focal plane is close to the surface of the wafer (i.e., focus offset equal to zero micrometers), more defects are detected closer to the surface, and when the focal plane is moved deep into the wafer (i.e., focus offset equal to three micrometers), more defects are detected at deeper locations (e.g., down to five micrometers deep).

Figure 9A:
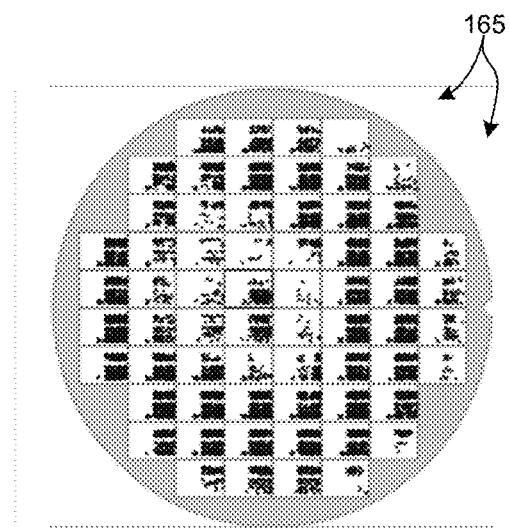
FIG. 9A depicts an illustration of a defect map resulting from a two dimensional optical inspection performed at a focus offset of two micrometers.
Figure 9B:
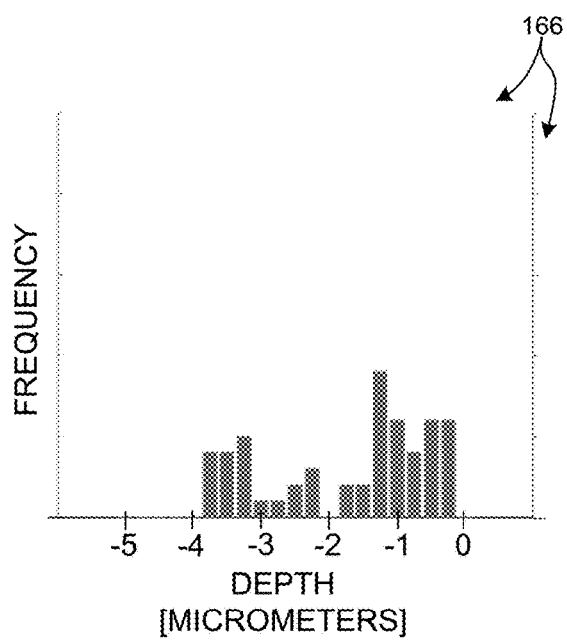
FIG. 9B depicts an illustration of the number of defects detected at different depths from the two dimensional optical inspection illustrated in FIG. 9A.
Figure 10B:
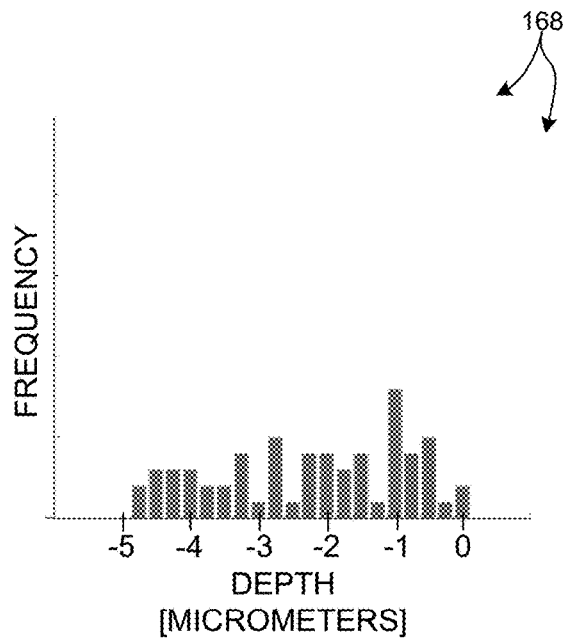
FIG. 10B depicts an illustration of the number of defects detected at different depths from the two dimensional optical inspection illustrated in FIG. 10A.

Also, FIG. 9B illustrates that even when inspecting at a focus offset of three micrometers, a population of defects at the surface of the wafer (defect depth of zero micrometer) is detected, in addition to defects detected deeper into the structure (defect depth of down to five micrometers).

Figure 11:
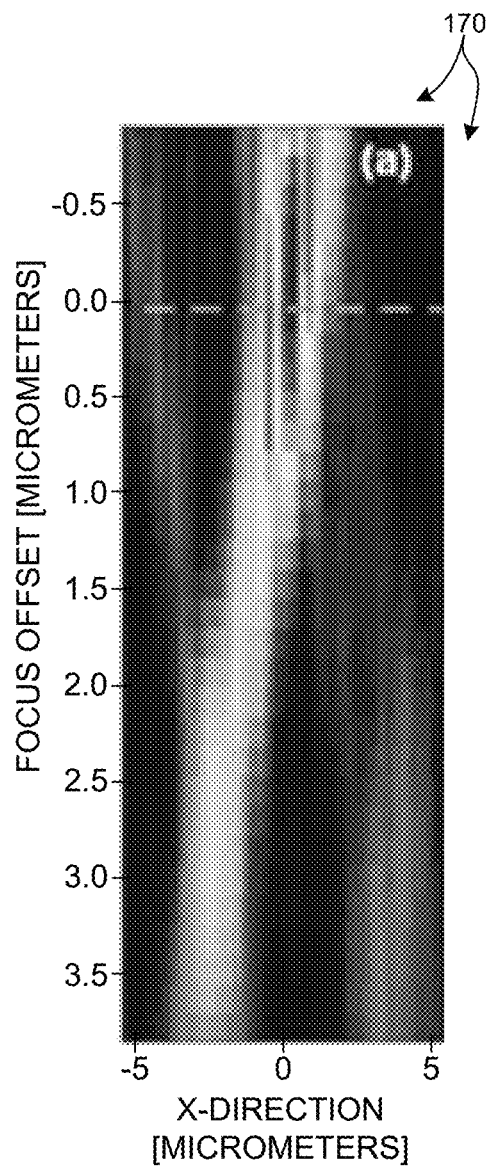
FIG. 11 illustrates a plot 170 of a cross-sectional view (y=0) of a measured three dimensional image illustrating a peak signal near a focus offset of zero micrometers.
Figure 12:
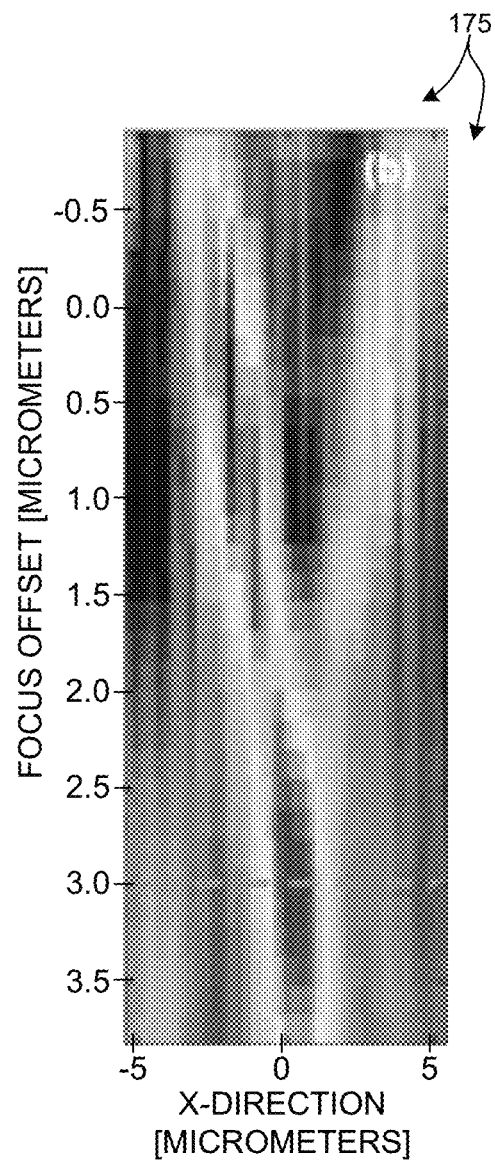
FIG. 12 depicts a plot 175 of a cross-sectional view (y=0) of a measured three dimensional image illustrating a peak signal near a focus offset of three micrometers.

FIG. 11 depicts a plot 170 of a cross-sectional view (y=0) of a measured three dimensional image illustrating a peak signal near a focus offset of zero micrometers. However, the optical signal of a defect detected at the surface (focus offset of zero micrometers) is also visible deeper into the wafer (near focus offset of three micrometers). Conversely, FIG. 12 depicts a plot 175 of a cross-sectional view (y=0) of a measured three dimensional image illustrating a peak signal near a focus offset of three micrometers. However, the optical signal of a defect detected three micrometers deep into the structure is also visible near the surface of the structure. Thus, the presence of many defects distributed throughout the volume of the wafer interferes with selecting defects detected near the bottom while optically inspecting near the surface, and vice-versa. However, in some examples, defects are classified by filtering defects in or out of the three dimensional image of the inspected volume based on depth. In this manner, three dimensional imaging enables improved defect classification of thick, multi-layer structures.

In general, computing system 130 is configured to detect and classify defects and estimate defect depths using electrical signals obtained from each detector. The computing system 130 may include any appropriate processor(s) known in the art. In addition, the computing system 130 may be configured to use any appropriate defect detection algorithm or method known in the art. For example, the computing system 130 may use a die-to-database comparison or a thresholding algorithm to detect defects on the specimen.

In addition, inspection system 100 may include peripheral devices useful to accept inputs from an operator (e.g., keyboard, mouse, touchscreen, etc.) and display outputs to the operator (e.g., display monitor). Input commands from an operator may be used by computing system 130 to adjust threshold values used to control illumination power. The resulting power levels may be graphically presented to an operator on a display monitor.

Inspection system 100 includes a processor 131 and an amount of computer readable memory 132. Processor 131 and memory 132 may communicate over bus 133. Memory 132 includes an amount of memory 134 that stores an amount of program code that, when executed by processor 131, causes processor 131 to execute the defect detection, classification, and depth estimation functionality described herein.

Figure 13:
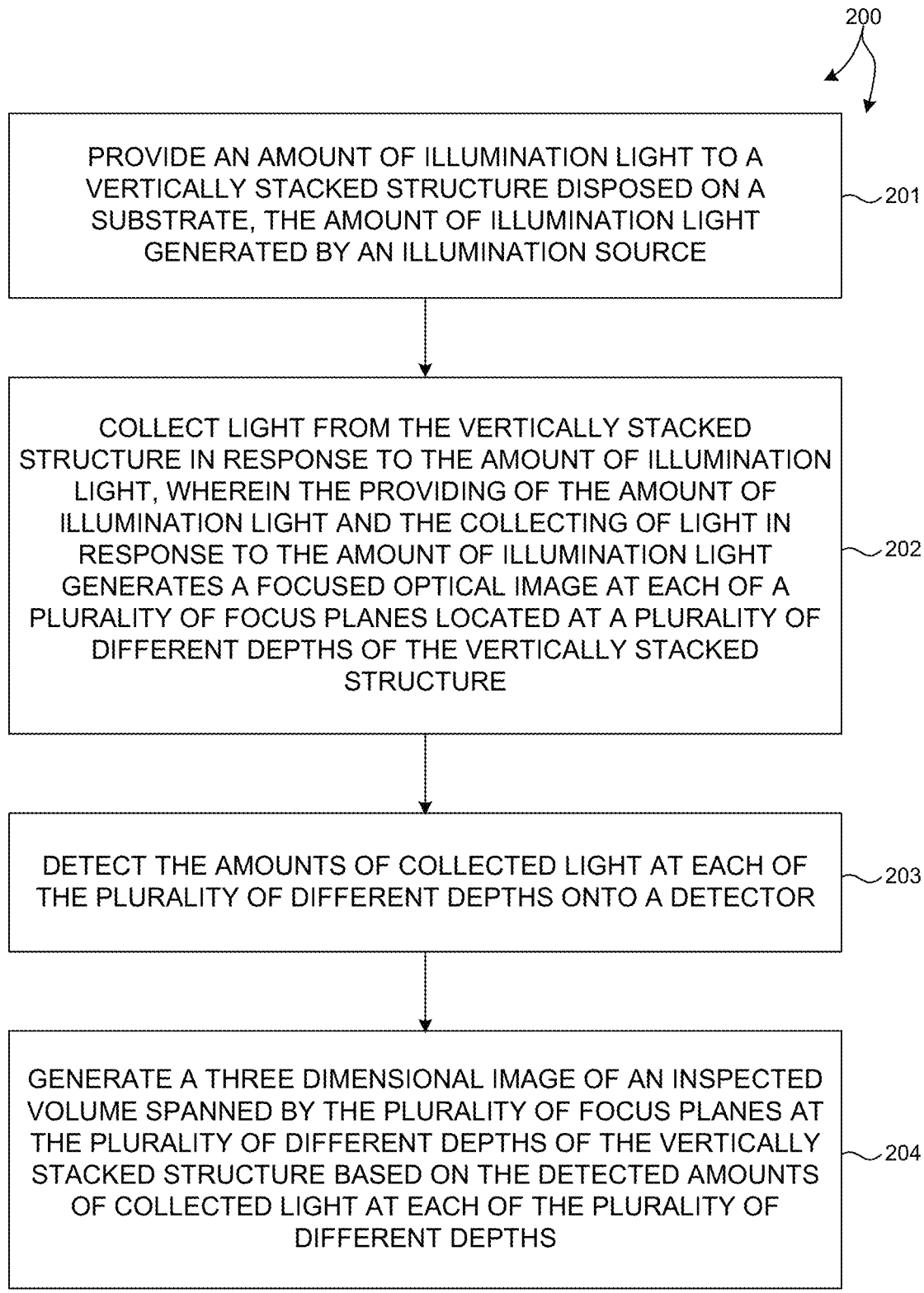
FIG. 13 illustrates a flowchart of an exemplary method 200 useful for detecting defects based on 3-D images of thick structures.

FIG. 13 illustrates a flowchart of an exemplary method 200 useful for detecting defects based on 3-D images of thick structures. In some non-limiting examples, inspection system 100 described with reference to FIG. 1 is configured to implement method 200. However, in general, the implementation of method 200 is not limited by the specific embodiments described herein.

In block 201, an amount of illumination light is provided to a vertically stacked structure disposed on a substrate.

In block 202, light is collected from the vertically stacked structure in response to the amount of illumination light. The optical subsystem that provides the amount of illumination light and collects light in response to the amount of illumination light generates a focused optical image at each of a plurality of focus planes located at a plurality of different depths of the vertically stacked structure.

In block 203, the amounts of collected light at each of the plurality of different depths are detected by a detector.

In block 204, a three dimensional image of the inspected volume of the vertically stacked structure spanned by the plurality of focus planes at the plurality of different depths is generated based on the detected amounts of collected light at each of the plurality of different depths.

In general, the three dimensional imaging techniques described herein can be applied during research and development, production ramp, and high volume production phases of manufacture of semiconductor devices, and is applicable to any optical, image-based measurement technique. In addition, these techniques may be applied to optical and x-ray inspection modalities.

Regardless of the particular type of fabrication process, defects need to be detected in all levels of a multiple layer stack and as early as possible in the particular process. Certain inspection embodiments preferably include detection of defects throughout a stack, including the stack surface and throughout the various depths of a stack. For example, certain embodiments allow defects to be found at depths of up to about three micrometers. In another embodiment, defects can be detected at stack depths that are as large as about eight micrometers. The thickness of a vertical ONON or OPOP stack under inspection is limited only by the depth of penetration of the illumination light. Transmission through an oxide-nitride-oxide-nitrite (ONON) or oxide-polysilicon-oxide-polysilicon (OPOP) stack is limited less by absorption at longer wavelengths. Thus, longer illumination wavelengths may be employed to effectively inspect very deep structures.

The three dimensional imaging techniques described herein can be applied to complex, vertically stacked structures, including, but not limited to 3D negative-AND (NAND) gate memory devices. Although inspection systems and techniques are described herein as being applied to certain types of vertical NAND (VNAND) memory structures, it is understood that embodiments of the present invention may be applied to any suitable 3D or vertical semiconductor structures, such as NAND or NOR memory devices formed using terabit cell array transistors (TCAT), vertical-stacked array transistors (VSAT), bit cost scalable technology (BiCST), piped shaped BiCS technology (P-BiCS), etc. The vertical direction is generally a direction that is perpendicular to the substrate surface. Additionally, although particular fabrication steps, processes, and materials are described for forming such 3D structures, inspection embodiments may be applied at any point in the fabrication flow that results in multiple layers being formed on a substrate, and such layers may include any number and type of materials.

Various embodiments are described herein for an inspection system or tool that may be used for inspecting a specimen. The term "specimen" is used herein to refer to a wafer, a reticle, or any other sample that may be inspected for defects, features, or other information (e.g., an amount of haze or film properties) known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as quartz. A reticle may be disposed above a resist-covered wafer during an exposure step of a lithography process such that the pattern on the reticle may be transferred to the resist.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. In one example, a detector may include a fiber array. In one example, inspection system 100 may include more than one light source (not shown). The light sources may be configured differently or the same. For example, the light sources may be configured to generate light having different characteristics that can be directed to a wafer at the same or different illumination areas at the same or different angles of incidence at the same or different times. The light sources may be configured according to any of the embodiments described herein. In addition one of the light sources may be configured according to any of the embodiments described herein, and another light source may be any other light source known in the art. In some embodiments, an inspection system may illuminate the wafer over more than one illumination area simultaneously. The multiple illumination areas may spatially overlap. The multiple illumination areas may be spatially distinct. In some embodiments, an inspection system may illuminate the wafer over more than one illumination area at different times. The different illumination areas may temporally overlap (i.e., simultaneously illuminated over some period of time). The different illumination areas may be temporally distinct. In general, the number of illumination areas may be arbitrary, and each illumination area may be of equal or different size, orientation, and angle of incidence. In yet another example, inspection system 100 may be a scanning spot system with one or more illumination areas that scan independently from any motion of wafer 103. In some embodiments an illumination area is made to scan in a repeated pattern along a scan line. The scan line may or may not align with the scan motion of wafer 103. Although as presented herein, wafer positioning system 114 generates motion of wafer 103 by coordinated rotational and translational movements, in yet another example, wafer positioning system 114 may generate motion of wafer 103 by coordinating two translational movements. For example, wafer positioning system 114 may generate motion along two orthogonal, linear axes (e.g., X-Y motion). In such embodiments, scan pitch may be defined as a distance between adjacent translational scans along either motion axis.

Accordingly, various modifications, adaptations, and combinations of various features of the described embodiments can be practiced without departing from the scope of the invention as set forth in the claims.

What is claimed is:

1. A system comprising:
   an optical subsystem comprising:
     an illumination subsystem that provides an amount of illumination light to a vertically stacked structure disposed on a substrate, the illumination subsystem comprising an illumination source, an illumination aperture subsystem and an illumination polarization subsystem;
     a collection subsystem that collects light from the vertically stacked structure in response to the amount of illumination light provided by the illumination subsystem, the collection subsystem comprising a collection aperture subsystem, wherein the optical subsystem generates a focused optical image at each of a plurality of focus planes located at a plurality of different depths of the vertically stacked structure;
   a detector configured to detect the light collected at each of the plurality of different depths and generate a plurality of output signals indicative of the amount of light collected at each of the plurality of different depths; and
   a computing system configured to:
     receive the plurality of output signals;
     communicate control commands to any of the illumination source, the illumination aperture subsystem, the collection aperture subsystem, and the illumination polarization subsystem that cause any of the illumination source to change a spectral range of the illumination light, the illumination aperture to change a shape of the illumination light provided to the substrate, the illumination polarization subsystem to change a polarization of illumination light provided to the substrate, and the collection aperture subsystem to change a shape of collected light at the detector to achieve a performance objective, wherein the performance objective is a minimization of a response of the vertically stacked structure in the three dimensional image, an enhancement of a defect signal in the three dimensional image, a minimization of wafer noise or one or more nuisance signals in the three dimensional image, a discrimination of the defect signal from wafer noise or the one or more nuisance signals in the three dimensional image, an improvement of an accuracy of an estimated physical location of the defect estimated from the three dimensional image, or any combination thereof;

generate a three dimensional image of an inspected volume spanned by the plurality of different depths of the vertically stacked structure based on the plurality of output signals;

determine the presence of a defect within the inspected volume based on the three dimensional image; and classify the defect as a defect of interest based on the three dimensional image, wherein the determining and classifying of the defect involves generating a two dimensional cross-section of the three dimensional image and determining whether a measured signal visible in the two dimensional cross-section exceeds a predetermined threshold value.

2. The system of claim 1, wherein the computing system is further configured to:

determine a location of the defect in three dimensions within the inspected volume of the vertically stacked structure.

3. The system of claim 2, wherein the determining of the location of the defect involves generating a two dimensional cross-section of the three dimensional image, and wherein the location of the defect is based on a depth associated with a value of the measured signal visible in the two-dimensional cross-section.

4. The system of claim 1, wherein the generating of the three dimensional image of the inspected volume involves aligning a plurality of images in two lateral dimensions each associated with different depths based on one or more alignment marks visible in each of the plurality of images.

5. The system of claim 1, wherein the computing system is further configured to:

filter the three dimensional image of the inspected volume, wherein the determining and classifying of the defect within the inspected volume is based on the filtered three dimensional image.

6. The system of claim 1, wherein the determining and classifying of the defect involves a model-based analysis of the three dimensional image or a library-based analysis of the three dimensional image.

7. The system of claim 2, wherein the determining of the location of the defect involves a model-based analysis of the three dimensional image or a library-based analysis of the three dimensional image.

8. The system of claim 1, wherein the classifying of the defect involves any of a three dimensional filter, a clustering algorithm, and a deep learning algorithm.

9. The system of claim 1, the collection subsystem further comprising a Fourier filter subsystem and a collection polarization subsystem, wherein the computing system is further configured to communicate control commands to any of the Fourier filter subsystem and the collection polarization subsystem that cause any of the Fourier filter subsystem to change a spatial frequency content of the collected light and the collection polarization subsystem to select a polarization of collected light at the detector to achieve the performance objective.

10. The system of claim 1, wherein the illumination subsystem is further configured to provide the amount of illumination light at a plurality of incidence angles, a plurality of illumination wavelengths, or both, wherein the collection subsystem further configured to collect light from the vertically stacked structure at the plurality of incidence angles, the plurality of illumination wavelengths, or both, wherein the detector is further configured to detect light collected at each of the plurality of incidence angles, each of the plurality of illumination wavelengths, or both, and generate a plurality of output signals indicative of the amount of light collected at each of the plurality of incidence angles, each of the plurality of illumination wavelengths, or both, and the computing system is further configured to generate an image of the inspected volume having more than three dimensions based on the plurality of output signals.

11. The system of claim 1, wherein the vertically stacked structure is a three dimensional NAND memory device.

12. The system of claim 1, wherein an illumination source of the illumination subsystem is a broadband laser sustained plasma light source.

13. The system of claim 1, wherein the illumination light includes wavelengths between 260 nanometers and 950 nanometers.

14. The system of claim 1, further comprising:

a wafer positioning system configured to scan the substrate in a scanning motion in two dimensions parallel to a substantially flat surface of the substrate at a plurality of different positions in a direction normal to the substantially flat surface, the wafer positioning system further configured to fix a position of the substrate in the two dimensions parallel to the substantially flat surface and move the substrate in the direction normal to the substantially flat surface.

15. A method comprising:

providing an amount of illumination light to a vertically stacked structure disposed on a substrate, the amount of illumination light generated by an illumination source;

collecting light from the vertically stacked structure in response to the amount of illumination light, wherein the providing of the amount of illumination light and the collecting of light in response to the amount of illumination light generates a focused optical image at each of a plurality of focus planes located at a plurality of different depths of the vertically stacked structure;

communicating control commands to any of an illumination source, an illumination aperture subsystem, a collection aperture subsystem, and an illumination polarization subsystem that cause any of the illumination source to change a spectral range of the illumination light, the illumination aperture to change a shape of the illumination light provided to the substrate, the illumination polarization subsystem to change the polarization of illumination light provided to the substrate, and the collection aperture subsystem to change a shape of collected light at the detector to achieve a performance objective, wherein the performance objective is a minimization of a response of the vertically stacked structure in the three dimensional image, an enhancement of a defect signal in the three dimensional image, a minimization of wafer noise or one or more nuisance signals in the three dimensional image, a discrimination of the defect signal from wafer noise or the one or more nuisance signals in the three dimensional image, an improvement of an accuracy of an estimated physical location of the defect estimated from the three dimensional image, or any combination thereof;

detecting the amounts of collected light at each of the plurality of different depths onto a detector;

generating a three dimensional image of an inspected volume spanned by the plurality of focus planes at the plurality of different depths of the vertically stacked structure based on the detected amounts of collected light at each of the plurality of different depths;

determining the presence of a defect within the inspected volume based on the three dimensional image; and classifying the defect as a defect of interest based on the three dimensional image, wherein the determining and classifying of the defect involves generating a two dimensional cross-section of the three dimensional image and determining whether a measured signal visible in the two dimensional cross-section exceeds a predetermined threshold value.

16. The method of claim 15, further comprising:
determining a location of the defect in three dimensions within the inspected volume of the vertically stacked structure.

17. The method of claim 16, wherein the determining of the location of the defect involves generating a two dimensional cross-section of the three dimensional image and wherein the location of the defect is based on a depth associated with a value of a measured signal visible in the two-dimensional cross-section.

18. The method of claim 15, wherein the generating of the three dimensional image of the inspected volume involves aligning a plurality of images in two lateral dimensions each associated with different depths based on one or more alignment marks visible in each of the plurality of images.

19. The method of claim 15, further comprising:
filtering the three dimensional image of the inspected volume, wherein the determining and classifying of the defect within the inspected volume is based on the filtered three dimensional image.

20. The method of claim 15, wherein the determining and classifying of the defect involves a model-based analysis of the three dimensional image or a library-based analysis of the three dimensional image.

21. The method of claim 16, wherein the determining of the location of the defect in three dimensions within the inspected volume of the vertically stacked structure involves a model-based analysis of the three dimensional image or a library-based analysis of the three dimensional image.

22. The method of claim 15, wherein the classifying of the defect involves any of a three dimensional filter, a clustering algorithm, and a deep learning algorithm.

23. The method of claim 15, further comprising:
communicating control commands to any of a Fourier filter subsystem and a collection polarization subsystem that cause any of the Fourier filter subsystem to change a spatial frequency content of the collected light and the collection polarization subsystem to select the polarization of collected light at the detector to achieve the performance objective.

24. The method of claim 15, wherein the illumination subsystem is further configured to provide the amount of illumination light at a plurality of incidence angles, a plurality of illumination wavelengths, or both, wherein the collection subsystem is further configured to collect light from the vertically stacked structure at the plurality of incidence angles, the plurality of illumination wavelengths, or both, wherein the detector is further configured to detect light collected at each of the plurality of incidence angles, each of the plurality of illumination wavelengths, or both, and generate a plurality of output signals indicative of the amount of light collected at each of the plurality of incidence angles, each of the plurality of illumination wavelengths, or both, and further comprising determining an image of the inspected volume having more than three dimensions based on the plurality of output signals.

25. The method of claim 15, wherein the vertically stacked structure is a three dimensional NAND memory device.

26. An apparatus comprising:
an optical subsystem comprising:
an illumination subsystem that provides an amount of illumination light to a vertically stacked structure disposed on a substrate, the illumination subsystem comprising an illumination source, an illumination aperture subsystem and an illumination polarization subsystem;
a collection subsystem that collects light from the vertically stacked structure in response to the amount of illumination light provided by the illumination subsystem, the collection subsystem comprising a collection aperture subsystem, wherein the optical subsystem generates a focused optical image at each of a plurality of focus planes located at a plurality of different depths of the vertically stacked structure;
a detector configured to detect the light collected at each of the plurality of different depths and generate a plurality of output signals indicative of the amount of light collected at each of the plurality of different depths; and
a computing system comprising:
one or more processors; and
a non-transitory, computer-readable medium storing instructions, that when executed by the one or more processors, cause the apparatus to:
receive the plurality of output signals;
communicate control commands to any of the illumination source, the illumination aperture subsystem, the collection aperture subsystem, and the illumination polarization subsystem that cause any of the illumination source to change a spectral range of the illumination light, the illumination aperture to change a shape of the illumination light provided to the substrate, the illumination polarization subsystem to change a polarization of illumination light provided to the substrate, and the collection aperture subsystem to change a shape of collected light at the detector to achieve a performance objective, wherein the performance objective is a minimization of a response of the vertically stacked structure in the three dimensional image, an enhancement of a defect signal in the three dimensional image, a minimization of wafer noise or one or more nuisance signals in the three dimensional image, a discrimination of the defect signal from wafer noise or the one or more nuisance signals in the three dimensional image, an improvement of an accuracy of an estimated physical location of the defect estimated from the three dimensional image, or any combination thereof;
generate a three dimensional image of an inspected volume spanned by the plurality of focus planes at the plurality of different depths of the vertically stacked structure based on the plurality of output signals;
determine the presence of a defect within the inspected volume based on the three dimensional image; and
classify the defect as a defect of interest based on the three dimensional image, wherein the determining and classifying of the defect involves generating a two dimensional cross-section of the three dimensional image and determining whether a measured signal visible in the two dimensional cross-section exceeds a predetermined threshold value.

27. The apparatus of claim 26, the non-transitory, computer-readable medium further storing instructions, that when executed by the one or more processors, cause the apparatus to:

determine a location of the defect in three dimensions within the inspected volume of the vertically stacked structure.

\* \* \* \* \*